Patented June 19, 1923.

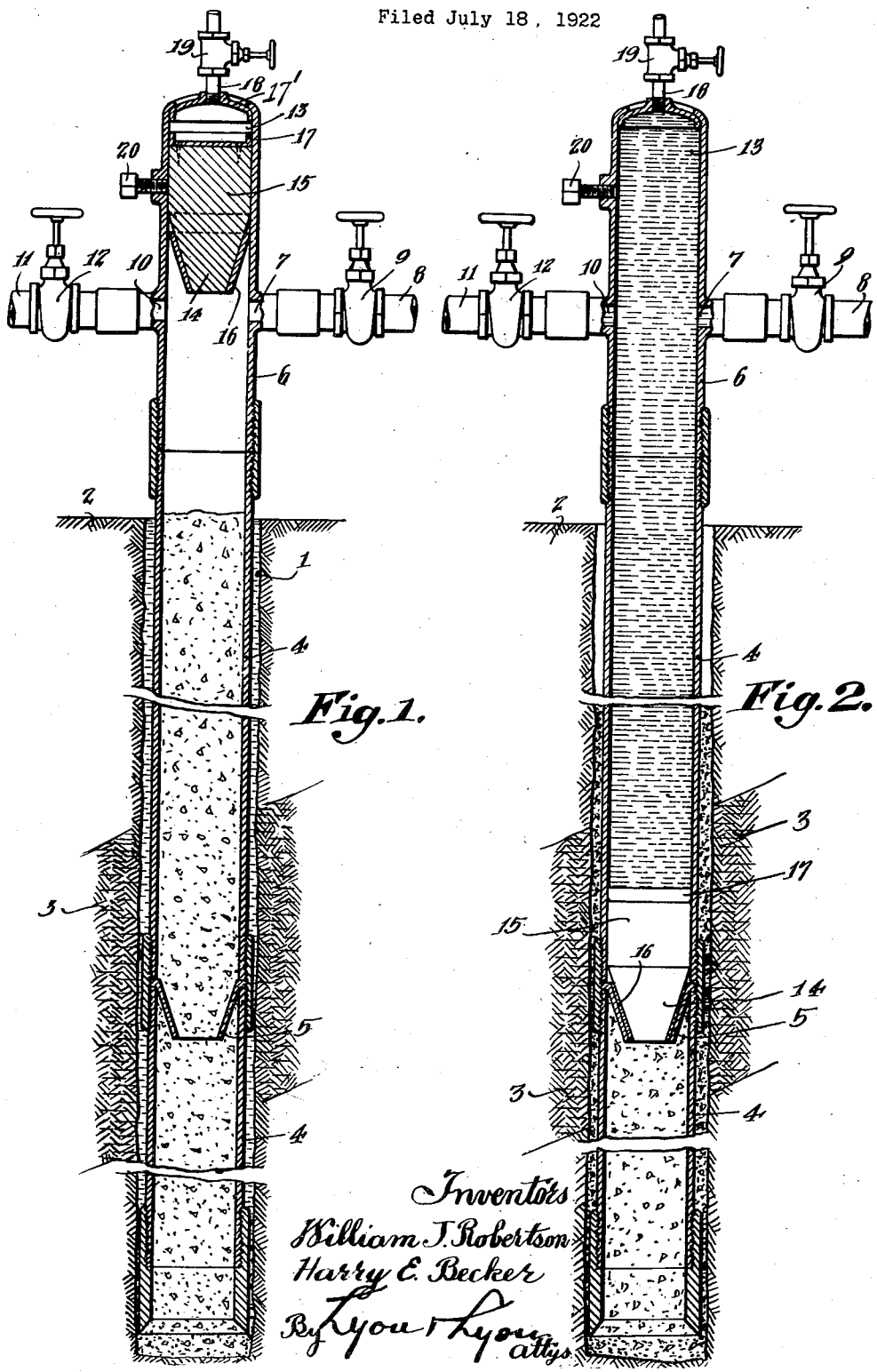

1,459,345

UNITED STATES PATENT OFFICE.

WILLIAM J. ROBERTSON AND HARRY E. BECKER, OF FULLERTON, CALIFORNIA.

WELL-CEMENTING APPARATUS.

Application filed July 18, 1922. Serial No. 575,785.

*To all whom it may concern:*

Be it known that we, WILLIAM J. ROBERTSON and HARRY E. BECKER, citizens of the United States, residing at Fullerton, in the county of Orange and State of California, have invented a new and useful Well-Cementing Apparatus, of which the following is a specification.

This invention relates to a well cementing apparatus and is particularly directed to that type of apparatus in which cement is forced into place by hydraulic pressure.

Troublesome results have often been experienced by water entering oil wells or by undesirable liquids entering water wells and to correct this condition a method heretofore practiced consisted of injecting cement into the well casing and then subjecting such cement to the direct action of water under pressure to force the cement from the lower end of the casing and upwardly between the casing and the walls of the well bore to block off the strata containing such undesirable liquids. In subjecting the cement to the direct action of the water the cement becomes diluted and as the length of time required to properly fill the space between the casing and the walls of the bore depend upon the consistency of the cement and the nature of said space it becomes evident that the period of time during which such water pressure should be utilized becomes a matter of guesswork. Therefore, it often happens that the water under pressure is left on until it is itself forced from the bottom of the casing where by reason of its mixing with the cement and also by reason of its more freely flowing character will render the cementing job very incomplete and ineffective.

These difficulties have in a measure been overcome by apparatus in which a barrier or plug divides the cement column from the water column within the casing and in which said plug is arrested by contact with the bottom of the well bore. Such apparatus will require a more or less accurate spacing of the bottom of the casing from the bottom of the well bore and in certain cases in hard formations may be effectively operated. But in some instances, especially in deep wells, such spacing offers considerable difficulty and in soft formations, especially quicksand, the bottom of the well after being subjected to the pressure of the column of cement and water under pressure may be forced downward a considerable distance from the position it occupied when the casing was adjusted. Under these conditions the adjustment of the casing from the bottom of the well is destroyed and the soft character of said bottom will not constitute a solid abutment such as is necessary to arrest the plug.

The present invention has for its objects to provide an apparatus which will overcome all of the above mentioned difficulties and defects; to provide an apparatus which is uniformly operative regardless of the nature of the formations and regardless of its position in the well; and to provide an apparatus in which the plug or follower is arrested at a predetermined position by a definitely positioned abutment within the well casing.

A further object of the invention is to provide a cement and water injecting head at the top of the well casing, in which the plug or cement forcing plunger is retained in alignment with the casing and above the cement and water supply ports until released for use.

Various other objects and advantages will be more fully apparent from the following description of the accompanying drawings, which form a part of this disclosure, and which illustrate a preferred form of embodiment of the invention.

Of the drawings:

Figure 1 is a central vertical section through the apparatus in position within a well bore, the parts being in normal position and the proper amount of cement having been flowed into the casing.

Fig. 2 is a similar section with the parts in operated position and illustrating the forcing of the cement downwardly in the casing and upwardly between the casing and the walls of the well bore.

In the drawings, 1 designates the well bore, 2 the ground, 3 a water stratum to be cemented off, and 4 the well casing, leaving a space around the casing.

Between any two predetermined casing sections is secured an adjustable abutment 5 forming a cone seat, and at the well surface a cement and water injecting head 6 is connected to the casing. The head 6 has a water inlet port 7 connected with a water supply line 8 having a control valve 9, and a cement inlet port 10 connected with a cement supply line 11 having a control valve 12. Each of these supply lines leads to a suitable source of supply from which the respective substance is forced under pressure into the head 6. The upper portion of the head 6 above the ports 7 and 10 forms a chamber 13 in which is normally positioned a plug or cement forcing plunger 14 which comprises a body 15 (preferably of wood) having a lower cone end surfaced with a pliable cone packing 16, and an upper flat surface to which is attached a cup packing 17.

The upper end of the chamber is closed by a head 17', preferably welded to the walls of the chamber, and has a vent 18 controlled by a valve 19.

A set-screw 20 screw-threaded in the wall of the chamber 13 normally engages the plug 14 to mainatin it in place.

In a well cementing operation it may be desired to first establish a circulation of water down the casing and upwardly through the space between the casing and the wall of the well bore to free said space of loose material or material tending to clog said space. This may be accomplished by opening the valve 9 until a free circulation is indicated.

The valve 9 is then closed and the valve 12 opened to inject a required amount of cement into the casing, as shown in Fig. 1, after which the valve 12 is closed.

The set-screw 20 is now withdrawn sufficiently to release the plug 14 and the vent valve 19 opened to allow the plug to drop below the ports 7 and 10, this dropping of the plug being insured by the suction created by the sinking column of cement.

After the plug is below the ports 7 and 10, the vent valve 19 is closed and the water supply valve 9 opened, in this manner water under pressure engages and forces the plug 14 downwardly, the plug forcing the cement downwardly in the casing and upwardly in the space between the casing and the walls of the well bore to a height considerably above the top of the water strata to be blocked or shut off from the well, such forcing of the cement by the hydraulic pressure of the water continuing until the plug 14 engages and becomes seated within the fixed cone abutment 5 which forms a positive stop to arrest the plug at a predetermined nonvariable distance from the bottom of the casing.

During the downward progress of the plug the water is prevented by the plug from coming in contact with the cement, and after the plug is arrested by the abutment 5 the water pressure is maintained until the cement hardens.

From the above it will be seen that in the present apparatus the plug or cement forcing plunger is arrested at a definite point in the casing and is in no way dependent upon the location of the casing in the well bore and for this reason any danger of the plug being forced out of the bottom of the casing is eliminated.

Further it will be evident that with the plug initially positioned in the head it is in position for instant use, this eliminating a necessity of opening the head and inserting the plug after the cementing operation is commenced and then again closing the head to complete the operation.

If it is subsequently desired to drill the well deeper the plug 14 and the seat 5 (which is preferably of cast iron) may be drilled through, and the well may thus be carried deeper without removing the plug, it being principally for this reason that the plug is made of wood.

With well cementing systems now in general use, and in which the water used to force the cement downward contacts directly with the cement, it is necessary to determine the cubic contents of the well casing and accurately measure the amount of water pumped in on top of the cement, so that just enough water will be forced into the casing to eject the major part of the cement, leaving just enough cement within the lower end of the casing to prevent the water being forced out the lower end thereof. This is done by either a meter on the water line or by gauge tanks, and requires comparatively clean water. With the present apparatus such measuring of the water is unnecessary, therefore, we may utilize the usual mud water pumped by the mud pump of the standard well drilling equipment. Thus by using the circulation mud as the means of forcing the cement from the casing, said mud more nearly equalizes the weight of the cement, and correspondingly decreases the applied pressure necessary to eject the cement.

While we have shown the apparatus in its preferred form, it is to be understood that the invention is not to be limited in this regard for it is susceptible of embodiment in various other forms all coming within the scope of the following claims.

We claim:

1. A well-cementing apparatus comprising a casing through which cement may be forced into a well-bore, means for injecting cement into the casing, a plunger element slidable within the casing above the cement, means creating a pressure within the casing above the plunger to move the plunger downwardly and force the cement from the lower end of the casing, and a stationary abutment carried by the casing and functioning to positively arrest the plunger at a fixed distance from the lower end of the casing.

2. A well-cementing apparatus comprising a casing through which cement may be forced into a well-bore, means for injecting cement into the casing, a plunger element slidable within the casing above the cement, means creating a pressure within the casing above the plunger to move the plunger downwardly and force the cement from the lower end of the casing, and a stationary annular abutment carried by the casing and projecting inwardly into the path of the plunger and functioning to positively arrest the plunger at a fixed distance from the lower end of the casing.

3. A well-cementing apparatus comprising a casing through which cement may be forced into a well-bore, means for injecting cement into the casing, a plunger element slidable within the casing above the cement and having a lower cone end, means creating a pressure within the casing above the plunger to move the plunger downwardly and force the cement from the lower end of the casing, and a stationary annular abutment carried by the casing and into which the cone end of the plunger may engage to positively arrest the plunger at a fixed distance from the lower end of the casing.

4. A well-cementing apparatus comprising a casing through which cement may be forced into a well-bore, a head closing the upper end of the casing, a plunger element normally positioned within said head, means for injecting cement into the head below the plunger, means for holding the plunger and releasable to permit the plunger to engage the cement, means creating a pressure within the head above the plunger to move the plunger downward and force the cement from the lower end of the casing and a stationary abutment carried by the casing and functioning to arrest the plunger at a fixed distance from the lower end of the casing.

5. A well-cementing apparatus comprising a casing through which cement may be forced into a well-bore, a head closing the upper end of the casing and having a cement inlet and a water inlet and providing a chamber above said inlets, a plunger element retained within the chamber and releasable to drop below the inlets, valves controlling said inlets whereby cement may be admitted below said plunger before its release, and water under pressure admitted above said plunger after its release to force the plunger downward and force the cement from the lower end of the casing, and an abutment carried by the casing and functioning to arrest the plunger at a fixed distance from the lower end of the casing.

Signed at Brea, Calif. this 12th day of July, 1922.

WILLIAM J. ROBERTSON.
HARRY E. BECKER.